US009631863B2

(12) United States Patent
McAlister

(10) Patent No.: US 9,631,863 B2
(45) Date of Patent: Apr. 25, 2017

(54) LIQUEFACTION SYSTEMS AND ASSOCIATED PROCESSES AND METHODS

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 13/797,869

(22) Filed: Mar. 12, 2013

(65) Prior Publication Data
US 2014/0260416 A1    Sep. 18, 2014

(51) Int. Cl.
F25J 1/00 (2006.01)
F25J 1/02 (2006.01)
B01D 53/00 (2006.01)

(52) U.S. Cl.
CPC .......... *F25J 1/0007* (2013.01); *F25J 1/0015* (2013.01); *F25J 1/0022* (2013.01); *F25J 1/0045* (2013.01); *F25J 1/0236* (2013.01); *B01D 53/002* (2013.01); *B01D 2257/504* (2013.01); *B01D 2257/708* (2013.01); *B01D 2257/7025* (2013.01); *F25J 2220/40* (2013.01); *F25J 2220/62* (2013.01); *F25J 2220/64* (2013.01); *F25J 2245/90* (2013.01); *Y02C 20/20* (2013.01)

(58) Field of Classification Search
CPC ........ F25J 1/0012; F25J 1/0015; F25J 1/0017; F25J 1/0236; F25J 1/0032; F25J 1/0045; F25J 1/0022; F25J 1/0025; F25J 2245/02; F25J 2270/02; F25J 2240/40; F25J 2270/62; F25J 2270/64

USPC ........................... 62/616, 617, 618, 619, 620
See application file for complete search history.

(56) References Cited

U.S. PATENT DOCUMENTS

| 4,815,815 | A | | 3/1989 | Mori | |
|---|---|---|---|---|---|
| 5,231,835 | A | * | 8/1993 | Beddome | ............... F25J 1/0015 62/615 |
| 5,450,728 | A | * | 9/1995 | Vora | ..................... B01D 5/0039 62/613 |
| 5,467,722 | A | * | 11/1995 | Meratla | ........................ 110/345 |

(Continued)

FOREIGN PATENT DOCUMENTS

WO    WO-9423993 A1    10/1994

OTHER PUBLICATIONS

International Search Report and Written Opinion for International Application No. PCT/US2010/045629; dated Feb. 5, 2013; 15 pages.

*Primary Examiner* — Frantz Jules
*Assistant Examiner* — Brian King
(74) *Attorney, Agent, or Firm* — Perkins Coie LLP

(57) ABSTRACT

Liquefaction systems and associated processes and methods are disclosed herein. Liquefaction systems in accordance with the present technology can include a liquefier positioned to liquefy gases from an emission stream. The liquefier can include a compressor configured to compress a first gas to produce a first liquid, and to compress a second gas to produce a second liquid. The first liquid can be directed to a first collection tank and the second liquid can be directed to a second collection tank. In some embodiments, a liquefaction system can direct a portion of a compressed liquid to a liquefier to pre-cool gases in the emission stream and/or to cool gases at various stages of compression.

9 Claims, 3 Drawing Sheets

(56) References Cited

U.S. PATENT DOCUMENTS

| | | | |
|---|---|---|---|
| 5,642,630 A * | 7/1997 | Abdelmalek | B01D 53/1431 62/632 |
| 5,772,733 A * | 6/1998 | Lokhandwala et al. | 95/39 |
| 5,941,098 A * | 8/1999 | Guillard | F25J 3/0403 62/656 |
| 5,950,732 A | 9/1999 | Agee et al. | |
| 6,178,670 B1 | 1/2001 | Susman et al. | |
| 6,220,052 B1 * | 4/2001 | Tate et al. | 62/613 |
| 6,220,053 B1 * | 4/2001 | Hass, Jr. | F25J 1/0015 62/613 |
| 6,237,347 B1 * | 5/2001 | Rigby et al. | 62/48.1 |
| 6,299,256 B1 | 10/2001 | Wyatt | |
| 6,490,883 B2 * | 12/2002 | Trembley | B01D 7/02 62/637 |
| 6,973,968 B2 | 12/2005 | Pfefferle | |
| 6,994,159 B2 | 2/2006 | Wendland | |
| 7,255,794 B2 | 8/2007 | Max et al. | |
| 7,343,971 B2 | 3/2008 | Pfefferle | |
| 7,546,880 B2 | 6/2009 | Zhang et al. | |
| 8,623,107 B2 | 1/2014 | McAlister | |
| 9,394,169 B2 | 7/2016 | McAlister | |
| 2002/0009338 A1 | 1/2002 | Blum et al. | |
| 2004/0118447 A1 | 6/2004 | Muhs et al. | |
| 2005/0063900 A1 | 3/2005 | Wang et al. | |
| 2005/0072301 A1 | 4/2005 | Baciu | |
| 2005/0092482 A1 | 5/2005 | Wendland | |
| 2006/0005572 A1 * | 1/2006 | Wikstrom et al. | 62/606 |
| 2006/0112911 A1 * | 6/2006 | Lawrence | F02D 15/02 123/48 B |
| 2007/0017243 A1 | 1/2007 | Kidwell et al. | |
| 2007/0240705 A1 | 10/2007 | Papadopoulos | |
| 2009/0124520 A1 | 5/2009 | Tohidi | |
| 2009/0133732 A1 | 5/2009 | Hsia et al. | |
| 2009/0199828 A1 * | 8/2009 | Luttgeharm | 123/65 R |
| 2012/0060554 A1 * | 3/2012 | Schmidt | 62/620 |
| 2014/0120025 A1 | 5/2014 | McAlister | |

* cited by examiner

LIQUEFACTION SYSTEMS AND ASSOCIATED PROCESSES AND METHODS

TECHNICAL FIELD

The present disclosure relates generally to liquefaction systems. More specifically, liquefaction systems that reduce emissions and/or provide for the capture and use of various gases are disclosed herein.

BACKGROUND

A variety of human activities produce gases or vapors that are emitted into the atmosphere. For example, numerous manufacturing and industrial processes involve the emission of large volumes of waste gases, volatile organic compounds (VOCs), carbon dioxide, and/or other gases. Additionally, the burning of fossil fuels to provide heating and electricity generation adds significant carbon dioxide to the atmosphere. Some of these gases are pollutants or undesirable byproducts whose capture would reduce the harmful effects of particular activities, while others are byproducts or incidental emissions that can provide beneficial uses if captured. In many instances, the capture of these gases or vapors by conventional means is uneconomical because they are either produced in small quantities or are entrained within a waste stream that includes one or more other gases and/or particulates that complicate the extraction and capture of the particular gas.

The capture of gases, including pollutants, undesirable byproducts, and/or desirable byproducts and incidental emissions, can be advantageous for numerous reasons. For example, capturing carbon dioxide from industrial processes can reduce anthropogenic global warming, and capturing VOCs at manufacturing facilities can decrease harmful emissions, increase efficiency, and reduce costs. Accordingly, it would be advantageous to provide systems for capturing gases that would otherwise be emitted to the atmosphere.

BRIEF DESCRIPTION OF THE DRAWINGS

Certain details are set forth in the following description and in FIGS. 1-3 to provide a thorough understanding of various embodiments of the disclosure. Other details describing well-known structures and systems often associated with liquefaction have not been set forth in the following disclosure to avoid unnecessarily obscuring the description of the various embodiments of the disclosure.

Many of the details and features shown in the Figures are merely illustrative of particular embodiments of the disclosure. Accordingly, other embodiments can have other details and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1:
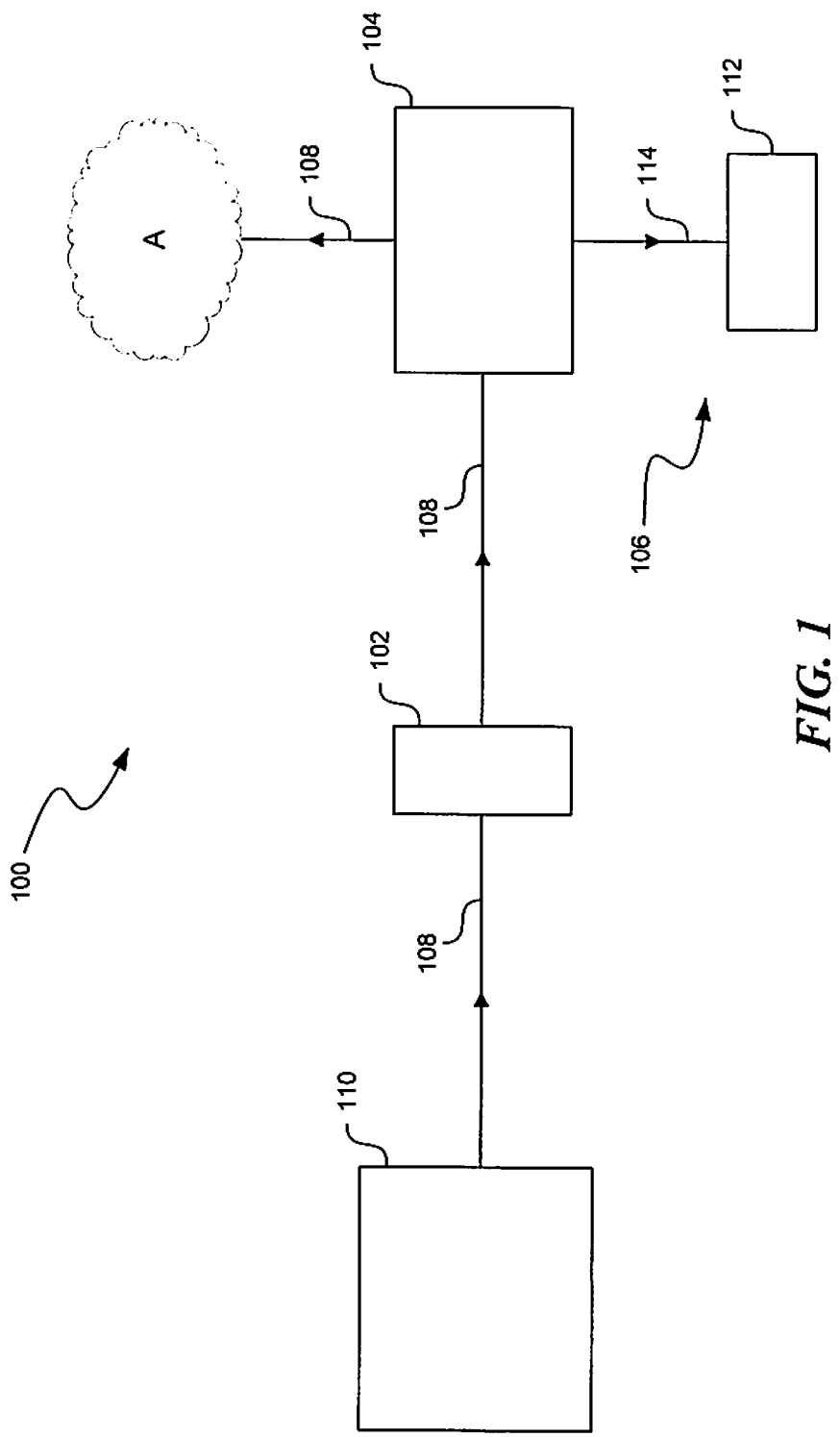

FIG. 1 is a partially schematic diagram of a liquefaction system configured in accordance with an embodiment of the present technology.

Figure 2:
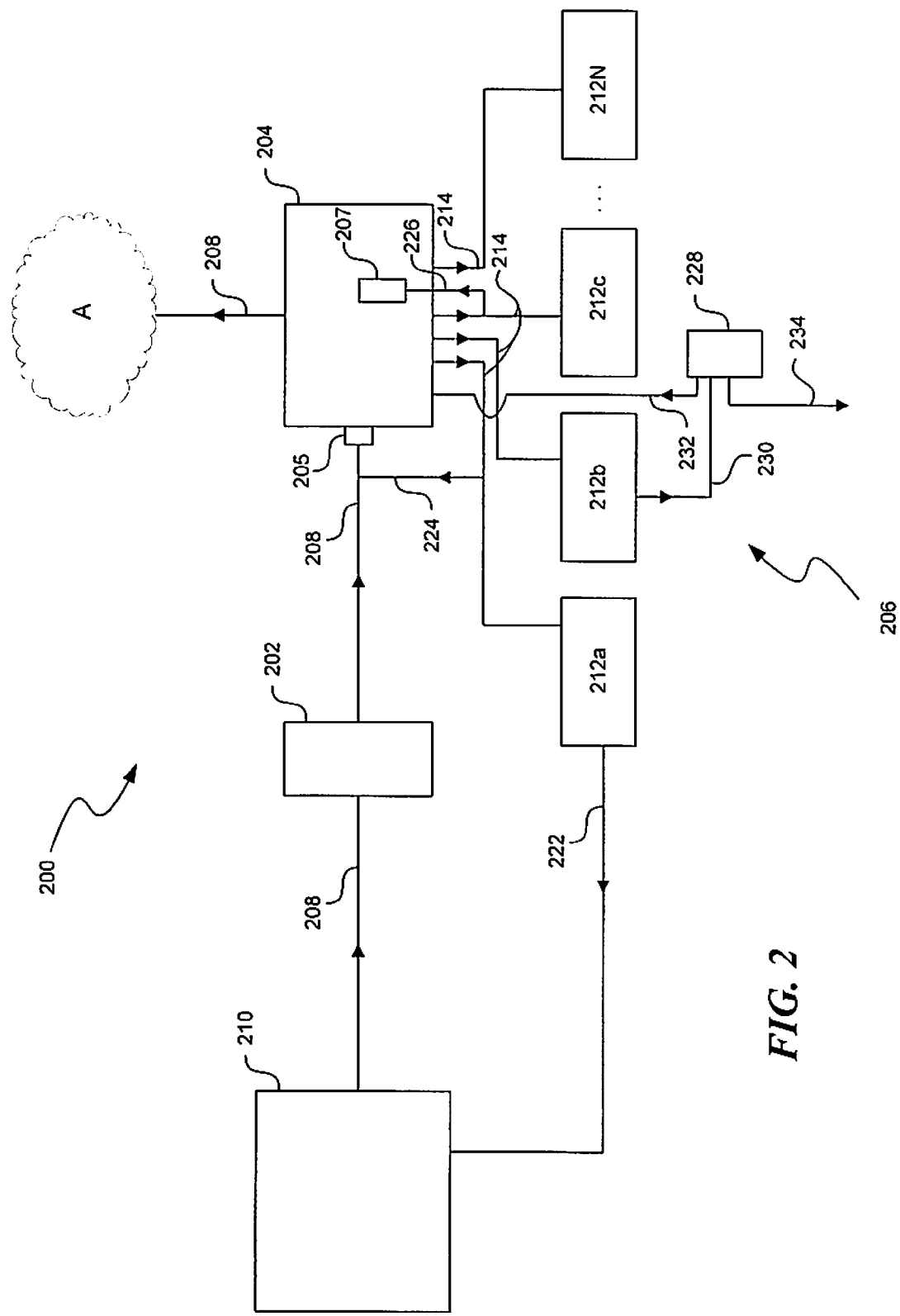
Figure 3:
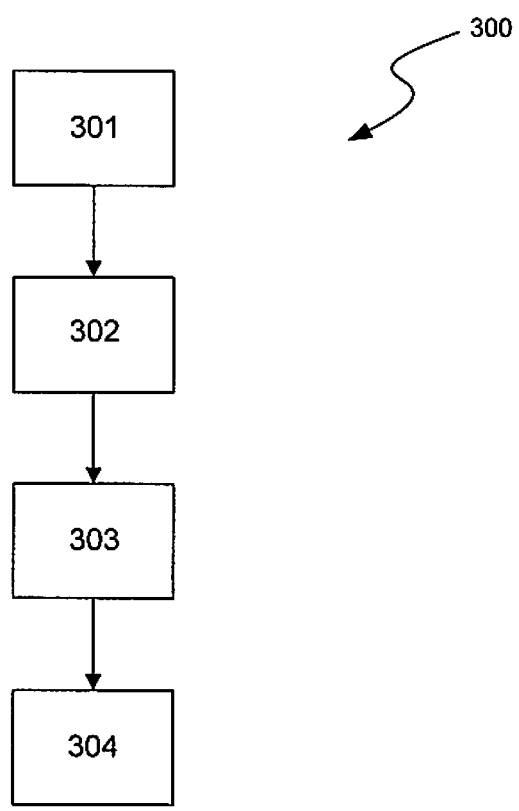

FIG. 2 is a partially schematic diagram of a liquefaction system configured in accordance with another embodiment of the present technology FIG. 3 is a flowchart showing a method for liquefying gases in accordance with the present technology.

DETAILED DESCRIPTION

The present technology includes various embodiments of systems, processes and methods for the liquefaction of gases. Embodiments in accordance with the present technology can include a variety of liquefiers, liquefaction systems, compressors, cooling systems, heat exchangers and/or other devices and systems for the compression and/or liquefaction of gases. In several embodiments, compressors, multi-stage compressors and/or turbo/rotary compressors can compress and/or liquefy gases. For example, embodiments in accordance with the present technology can include multi-stage compressors such as those described in U.S. patent application entitled "MULTI-STAGE COMPRESSORS AND ASSOCIATED SYSTEMS, PROCESSES AND METHODS," U.S. patent application Ser. No. 13/802,202, filed on Mar. 13, 2013, which is incorporated by reference herein in its entirety.

FIG. 1 is a schematic diagram of a liquefaction system 100 configured in accordance with an embodiment of the present technology. In the illustrated embodiment, the liquefaction system 100 includes a filtration system 102, a liquefier 104 and a liquid collection system 106 having a collection tank 112. The liquefaction system 100 can be operably coupled to an emission system (e.g., an emission stack, ventilation system, etc.) of an emission source or facility 110 to receive an emission stream 108. For example, in one embodiment, the facility 110 can be a bakery, brewery, calciner, ethanol plant, municipal waste treatment plant or digester, power plant, or some other facility or manufacturer. The facility 110 can be an emission source of carbon dioxide and/or a manufacturer that utilizes or generates VOCs during their manufacturing process and includes VOCs in the emission stream 108.

The filtration system 102 can include a variety of filtration technologies and can remove material from the emission stream 108 to prevent potentially damaging materials from entering the liquefier 104. For example, electrostatic precipitators, High-Efficiency Particulate Air (HEPA) filters, scrubbers, and/or other filtration technologies can be employed to remove particulates, gases and/or other materials from the emission stream 108. In several embodiments, the removal of these materials can increase the efficiency of the liquefier 104, prevent damage to the liquefier 104, and/or reduce the overall pollution contained in the emission stream 108. Although the illustrated embodiment of FIG. 1 includes the filtration system 102 positioned upstream of the liquefier 104, other embodiments can include a filtration system positioned downstream of the liquefier 104, filtration systems positioned both upstream and downstream of the liquefier 104, and/or a filtration system incorporated into the liquefier 104.

The liquefier 104 can receive the emission stream 108 and liquefy all of the emission stream 108 or a portion of the emission stream 108. For example, in the illustrated embodiment, the liquefier 104 liquefies a portion of the emission stream 108 to produce a liquid stream 114 and the remainder of the emission stream 108 is emitted to the atmosphere A. In some embodiments, the entire emission stream 108 can be liquefied to produce the liquid stream 114. The liquid stream 114 can be directed to the collection tank 112 for reuse, repurposing and/or other uses or operations, as further discussed below. The liquefier 104 can include one or more compressors, cooling systems, heat exchangers and/or other devices and systems for the compression and/or cooling of gases to produce liquids. Furthermore, the liquefier 104 can include a multi-stage compressor having a combustion chamber to combust fuels and provide a driving force for compression. The liquefier 104 can also include a gas turbine compressor having thermo-chemical regeneration capabilities, as described in U.S. patent application entitled "Fuel Conditioner, Combustor and Gas Turbine Improvements," U.S. Patent Application No. 61/788,756, filed on Mar. 15, 2013, which is incorporated by reference herein in its entirety.

Additionally, in several embodiments, the liquefier 104 can utilize one or more additions of absorbers, phase change agents, and/or refrigerants to provide adaptively variable boiling temperatures. Illustratively, such recycled solvent and refrigerant can cool and liquefy carbon monoxide and subsequently methane and separate such compounds from a mixture of gases while minimizing irreversible energy transfers. The resulting high-efficiency cycle enables a single compressor to separate numerous substances from a mixture of multiple gases. The compressor can be selected from various types including positive displacement, rotary and turbo machinery, and thermo-acoustic driver pulse tube designs including optional operation according to simplified Stirling or Schmidt cycles. In operation, the varying boiling points and/or vapor pressures of the particular components of a gaseous source can produce phase change separation via liquefaction at different stages of compression or cooling within the liquefier 104. The liquefier 104 can direct each of the individual components to a particular location as they are liquefied, as further described below.

FIG. 2 is a schematic diagram of a liquefaction system 200 configured in accordance with an embodiment of the present technology. Similar to the liquefaction system 100, the liquefaction system 200 is operably coupled to an emission system of a facility 210 to receive an emission stream 208. Additionally, the liquefaction system 200 includes a filtration system 202 and a liquefier 204. The liquefaction system 200 further includes a collection system 206 having a plurality of collection tanks 212 (identified individually as a first collection tank 212a through an Nth collection tank 212N). The liquefier 204 can include an inlet 205 configured to receive gases. The emission stream 208 can include a variety of gases and can be directed through the inlet 205. The liquefier 204 can liquefy the gases from the emission stream 208 and individually direct each of the resulting liquids or liquid streams 214 to a corresponding individual collection tank 212. For example, in one embodiment, the liquefier 204 can liquefy an emission stream 208 that contains one or more VOCs (e.g., acetone) and air. The liquid VOC can be directed to the first collection tank 212a, and various liquid constituents of the air (e.g., nitrogen, oxygen, etc.) can be individually directed to the second collection tank 212b through the Nth collection tank 212N. Accordingly, the liquefier 204 can liquefy a first gas and direct a resulting first liquid to the first collection tank 212a, and can liquefy a second gas and direct a resulting second liquid to the second collection tank 212b. In some embodiments, all of the constituents of the air, and any other gases in the emission stream 208, can be liquefied and directed to one of the collection tanks 212. In other embodiments, some constituents of the air and/or other gases in the emission stream 208 can be emitted to the atmosphere A.

In several embodiments, one or more of the liquids delivered to the collection tanks 212 can be reused in the facility 210. For example, in the illustrated embodiment of FIG. 2, a recovery line 222 extends from the collection tank 212a to the facility 210. The recovery line 222 can direct or return the first liquid to the facility 210. In manufacturing facilities that utilize VOCs, the gaseous VOCs that are captured and liquefied can be returned to the facility 210 to reduce the overall consumption and provide a concomitant reduction in operational costs. Similarly, for facilities that produce VOCs for distribution and sale, the liquefaction system 200 can recuperate gaseous products that would otherwise be a source of pollution, and can thereby increase the overall production of a facility. Furthermore, the reduced emissions can result in improved air quality and decreased liability or remediation costs.

Liquefaction systems in accordance with the present technology can provide increased energy efficiency in a variety of manners. In the illustrated embodiment of FIG. 2, for example, a first return line 224 can direct liquefied components or a portion of the liquefied components back to the inlet 205 of the liquefier 204. The return of liquefied components can increase the efficiency of the liquefier 204 by decreasing an inlet temperature and pre-cooling the gaseous components and/or by cooling components of the liquefier 204 that interact with the gaseous components. For example, in several embodiments, the liquefied gaseous components can cool cylinder walls of compression chambers within the liquefier 204. In other embodiments, the liquefied gaseous components can cool blades or other components of a turbine or rotary compressor that is part of the liquefier 204.

In addition to the pre-cooling of gaseous components, liquefied gaseous components can be returned to a heat transfer device 207 (e.g., a heat exchanger or other heat transfer component) of the liquefier 204 to act as a heat sink and/or cool gases at various stages of compression. In the illustrated embodiment of FIG. 2, a second return line 226 can direct a liquefied component or a portion of a liquefied component back to the liquefier 204. In some embodiments, for example, liquefied gaseous components of air (e.g., nitrogen) can be redirected back to the liquefier 204 as a heat sink to aid in the liquefaction of natural gas.

Furthermore, embodiments in accordance with the present technology can include pressurization systems that utilize liquefied gases to pressurize fuel storage and/or injection systems. For example, in the illustrated embodiment of FIG. 2, a pressurization system 228 is operably coupled to the second tank 212b via a relief line 230. Reconstituted gases that boil off from the second tank 212b can be directed to the pressurization system 228 via the relief line 230. The pressurization system 228 can include relief valves, expansion tanks, and/or other components that can regulate the pressure of gases in the pressurization system 228. Reconstituted gases at a variety of pressures can be directed from the pressurization system 228 to the liquefier 204 via a first gas supply line 232, or to other locations via a second gas supply line 234. For example, the second tank 212b can receive liquid natural gas from the liquefier 204, and the reconstituted natural gas that boils off from the second tank 212b can be directed to the pressurization system 228. The pressurization system 228 can direct the natural gas through the first gas supply line 232 as a fuel for the liquefier 204 (e.g., to power the liquefier 204 via combustion in a combustion chamber). The pressurization system 228 can also direct the reconstituted natural gas through the second gas supply line 234 to another device or location (e.g., a compressed gas storage facility, a furnace for heating of the facility 210, etc.). Although the embodiment of FIG. 2 described herein includes the pressurization system 228 operably coupled to the second collection tank 212b, embodiments in accordance with the present technology can include one or more pressurization systems coupled to any of the collection tanks 212.

In some embodiments, the emission source 110 or 210 can be a fossil fuel production site (e.g., an oil well, coal mine, etc.), a refinery, or another source or emitter of gaseous fossil fuels and/or oxides of carbon or oxides of nitrogen. For example, it is common for oil wells to produce significant natural gas and/or other gaseous byproducts. At many oil wells, systems for collection and transportation of these gaseous fuels are not available, and the gas is wastefully burned in a flare stack. The liquefaction system 100 or 200 can be operably coupled to such a gaseous fuel source to liquefy the fuel for storage and/or transportation. Accordingly, rather than burning of the gas, the liquefied fuel can be utilized locally at another location, or sold. Similarly, at many refineries, excess gases are often burned off or otherwise emitted to the atmosphere due to the lack of a system for collection or transportation. Accordingly, in several embodiments, the liquefaction system 100 or 200 can be operably coupled to a production line at a refinery to capture and liquefy gaseous fuels.

Liquefaction systems in accordance with the present technology can be used to capture and liquefy a variety of valuable gases that are often vented to the air and wasted. For example, at many natural gas fields, or at various stages of transportation or refinement, natural gas is stripped of inert components (including nitrogen and helium) to increase the BTU content of the natural gas. Although helium and nitrogen are valuable gases that can be used in numerous industries, these gases are often vented or otherwise disposed because systems are not available to collect, contain or transport them. The liquefaction systems 100 or 200 can be operably coupled to a raw gas transport conduit or to the vent source at these facilities and can liquefy the nitrogen and helium, thereby reducing the volume, and store the resultant liquids in the tanks 112 or 212.

In several embodiments, the liquefaction systems 100 and 200 can be configured to liquefy a particular component of the emission stream 108 or 208 (or of another gaseous source). Configuring the liquefaction systems for particular components can reduce the energy required to perform the liquefaction. For example, compared to the constituents of air, VOCs have relatively high boiling points, and will therefore liquefy at higher temperatures and/or lower pressures. The VOC formaldehyde, for example, has a boiling point of minus 19 degrees Celsius, while nitrogen, the main constituent of air, has a boiling point of minus 196 degrees Celsius. Therefore, liquefaction systems can liquefy formaldehyde at much higher temperatures and lower pressures than that required for the liquefaction of nitrogen. Higher temperatures and lower pressures require less cooling and/or less compression, thereby reducing the energy necessary to achieve liquefaction. Accordingly, the liquefaction systems 100 and 200 can be configured to reduce energy consumption by adjusting the operating pressure and/or temperature to liquefy particular gases.

The liquefaction systems 100 and 200 can separate gaseous components via a variety of suitable manners. In several embodiments, the liquefiers 104 and 204 can include compressors and/or other components that aid in the separation of oxygen and/or other gases. For example, in addition to the liquefaction of gases via a phase change separation through the compression and/or cooling described above, the liquefiers 104 and 204 can separate gases via additional processes. In several embodiments, the liquefiers 104 and 204 can include adsorbents, and oxygen or other gases can be separated via pressure swing and/or temperature swing "sorption" such as adsorbtion or absorption. Additionally, the liquefier 104 can include filters that can separate oxygen or other gases via molecular filtration or diffusion including ionic diffusion such as proton diffusion through polymer or ceramic membranes with or without galvanic bias impetus and/or pressure gradient. Embodiments in accordance with the present technology can include systems described in U.S. Pat. No. 8,313,556, entitled "DELIVERY SYSTEM WITH IN-LINE SELECTIVE EXTRACTION DEVICES AND ASSOCIATED METHODS OF OPERATION," filed on Feb. 14, 2011, which is incorporated by reference herein in its entirety.

FIG. 3 is a flowchart showing a method 300 for liquefying gases in accordance with the present technology. The method 300 begins at block 301 by receiving the emission stream 108 or 208 at the filtration system 102 or 202. The emission stream 108 or 208 can originate from a source or facility 110 or 210, or from an emission system of the facility 110 or 210. The method 300 continues at block 302 by filtering the emission stream 108 or 208 to remove impurities, including particulates, gases, and/or other materials. Filtering the emission stream 108 or 208 can include filtering with electrostatic precipitators, High-Efficiency Particulate Air (HEPA) filters, scrubbers and/or other filtration technologies.

The method 300 then continues at block 303 by receiving the emission stream 108 or 208 at the liquefier 104 or 204 and liquefying at least one gas contained in the emission stream 108 or 208 to produce the liquid stream 114 or 214. In several embodiments, the method 300 can include liquefaction of a portion of the emission stream 108. In other embodiments, the entire emission stream 108 can be liquefied. At block 304, the method 300 continues by directing the liquid stream 114 to the collection tank 112.

The method 300 can further include a step of liquefying additional gases. For example, the liquefier 204 can liquefy a plurality of gases and direct individual gases to corresponding individual collection tanks. The liquefaction of the plurality of gases can include the separation of the gases and/or liquids via a variety of processes, including: phase change separation, pressure swing sorbtion, temperature swing sorbtion, and/or molecular filtration.

The method 300 can also include a step of returning a liquefied component to the liquefier 204. The liquefied component can be directed to the liquefier 204 via a first return line 224 and/or a second return line 226 to pre-cool gaseous components entering the liquefier 204, to cool components of the liquefier 204, and/or to act as a heat sink and cool gases at various stages of compression.

The method 300 can further include a step of directing gases from one or more collection tanks 212 to a pressurization system 228. The pressurization system 228 can regulate the pressure of one or more gases and can direct gases at a variety of pressures to the liquefier and/or to other devices or locations.

From the foregoing, it will be appreciated that specific embodiments of the invention have been described herein for purposes of illustration, but that various modifications may be made without deviating from the spirit and scope of the various embodiments of the invention. For example, several embodiments may include various suitable combinations of components, devices and/or systems from any of the embodiments described herein. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

I claim:

1. A liquefaction system for liquefying gases from an emission stream, the liquefaction system comprising:
   a liquefier having a compressor configured to:
      compress a first gas to produce a first liquid; and
      compress a second gas to produce a second liquid, wherein the liquefier includes an inlet configured to receive the first gas and the second gas;
   a first collection tank to receive the first liquid, and a second collection tank to receive the second liquid; and
   a return line configured to direct a portion of the first liquid to the inlet, such that the portion of the liquid enters the liquefier in a liquid state.

2. The liquefaction system of claim 1 wherein the liquefaction system is operably coupled to an emission source producing the emission stream, the liquefaction system further comprising a recovery line configured to direct the first liquid to the emission source.

3. The liquefaction system of claim 2 wherein the first liquid is a volatile organic compound, and wherein the first liquid is directed to the emission source for reuse in a manufacturing process.

4. The liquefaction system of claim 2 wherein the emission source comprises a fossil fuel production site, and wherein the first liquid is natural gas.

5. The liquefaction system of claim 1 wherein the return line is a first return line, wherein the liquefier includes a heat exchanger, and wherein the liquefaction system further comprises a second return line configured to direct liquid nitrogen to the heat exchanger.

6. The liquefaction system of claim 1, further comprising a pressurization system operably coupled to the first collection tank, the pressurization system configured to receive a reconstituted gas from the first collection tank and deliver the reconstituted gas to the liquefier.

7. The liquefaction system of claim 1 wherein the return line is a first return line, wherein the liquefier includes a heat exchanger, and wherein the liquefaction system further includes a second return line configured to direct a portion of the second liquid to the heat exchanger.

8. A liquefaction system for liquefying gases, the liquefaction system comprising:
   a liquefier positioned to receive an emission stream having a gas, wherein the liquefier comprises a multi-stage compressor having a combustion chamber and a compression chamber, wherein the multi-stage compressor includes an engine block, wherein the combustion chamber and the compression chamber are positioned within the engine block, and wherein the liquefier is configured to compress the gas to produce a liquid;
   a collection tank positioned to receive the liquid;
   a return line configured to direct a portion of the liquid to the liquefier, such that the portion of the liquid enters the liquefier in a liquid state; and
   a pressurization system positioned to receive reconstituted gas from the collection tank and direct it to the combustion chamber.

9. The liquefaction system of claim 8 wherein the emission stream includes a second gas, wherein the liquefier is further configured to compress the second gas to produce a second liquid, wherein the collection tank is a first collection tank, and wherein the liquefaction system further comprises:
   a second collection tank positioned to receive the second liquid; and
   a return line positioned to direct a portion of the second liquid to the liquefier.

\* \* \* \* \*